Feb. 19, 1952     J. G. FORD     2,586,320
METHOD OF MAKING CORE AND COIL ASSEMBLIES
Filed April 13, 1948
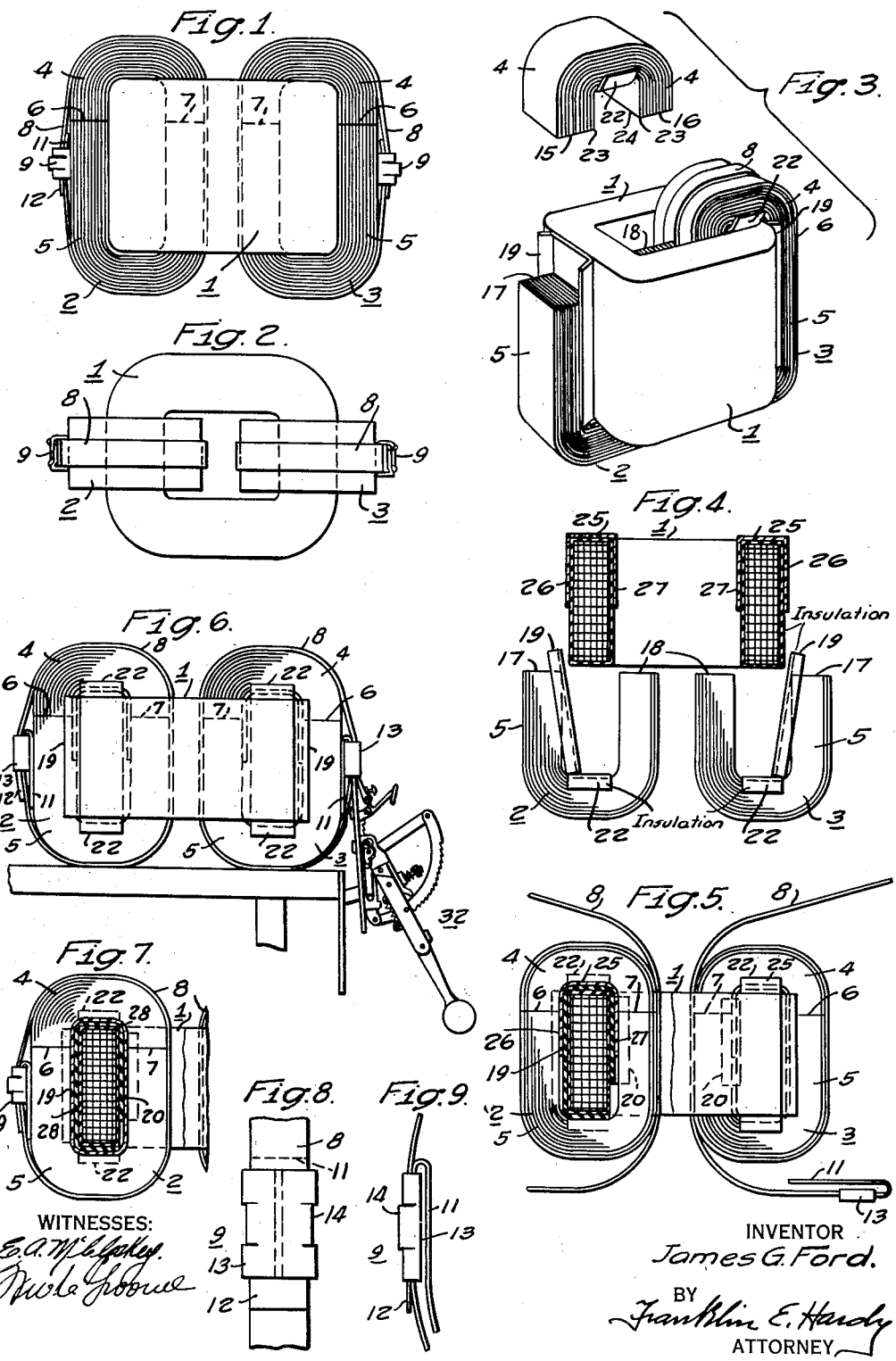
INVENTOR
James G. Ford.
BY
Franklin E. Hardy
ATTORNEY Patented Feb. 19, 1952

2,586,320

UNITED STATES PATENT OFFICE 2,586,320

METHOD OF MAKING CORE AND COIL ASSEMBLIES

James G. Ford, Sharon, Pa., assignor to Westinghouse Electric Corporation, East Pittsburgh, Pa., a corporation of Pennsylvania Application April 13, 1948, Serial No. 20,703

4 Claims. (Cl. 29—155.58)

My invention relates to electrical induction apparatus such as transformers, and particularly to the core of magnetic circuit structure thereof.

Magnetic sheet steel has been developed having preferred orientation of the axis of the easiest magnetization of the crystal grains of the material in a given direction, such as the direction of rolling of the sheet or strip forming it. When the lines of magnetic flux pass through such steel substantially in the preferred direction, the core loss is less, and the permeability of the steel is higher, than when the lines of magnetic flux pass at an angle to the direction of rolling, and these properties are poorest when the lines of magnetic flux are substantially perpendicular to the direction of rolling.

The permeability of steel having a preferred orientation of the grains in the direction of rolling is considerably higher at operating densities than the permeability of commercial grades of hot-rolled silicon steel at the same densities. Likewise, the watts loss per unit volume or unit weight at operating densities is lower than for commercial grades of hot-rolled silicon steel at the same densities when magnetized in the direction of rolling.

It will be seen therefore, that if a core is formed of a ribbon of sheet steel having preferred orientation of the grains in the direction of rolling of the strip, that is, in the direction in which the lines of magnetic flux pass through the strip, a core having high permeability and low watts loss will result. The loops of magnetic material comprising the core may be made by winding a continuous strip of material flatwise to give the desired dimensions, the loop being cut to provide butt joints at suitable places to form separable core portions that fit over the copper windings.

Such cores have been formed by winding successive layers of magnetic sheet material flatwise, layer upon layer, about a rectangular mandrel, annealing the wound layers to remove strains caused by winding, bonding the wound layers together by impregnating the spaces between the successive layers with a bonding or filling material, and baking the core loops to harden the bonding material, thereby providing a solid or non-yielding laminated structure having a film interlayer bond for all portions of the layers of sheet steel which is beneficial in producing a smooth cut surface forming the face of the butt joints.

When the steel ribbon forming the core is wound layer upon layer, the layers bonded together and baked to form a solid loop structure, the loop is then cut into separate upper and lower portions. The laminations of the resulting separable portions are held together as a solid mass so that there is no vibration or relative movement of the layers.

It has been found desirable to work the meeting faces between the separable core portions in order to provide smooth flat surfaces at the butt joint that are adapted to join and provide a minimum air gap. The worked surfaces may be acid etched to remove burrs after working the end surfaces of the core portions. It has also been found desirable to insulate the magnetic material between the separable portions of the core meeting at the butt joints. Joint compound material suitable for this purpose may be one of the combination of long chain molecules of the alvar or vinylite type or other oil and acid resisting resins such as described in the patent to H. V. Putman 2,318,095 for Core Structure, issued May 4, 1943, and assigned to the same assignee as this application. These materials are somewhat thermoplastic and have the property of tenaciously adhering to the metal surfaces.

In the method of assembling core structures of the above-described character and the use of conventional insulating materials, there is always the possibility that the upper core portion will scrape particles of the insulation positioned about the coil or winding, during the operation of placing the two-core portions together, and carry these particles of insulation into the core joint. When such particles are carried into the joint between the butt joint surfaces they cannot be seen and, therefore, are in place when the core portions are banded together. It is found that these particles in the order of a few thousandths of an inch and larger will separate the butt joint surfaces sufficiently to result in a noisy core structure. Once a core has been assembled and found to be noisy due to dirt or particles of insulation in the gap between the butt joint surfaces it will continue to be noisy throughout the life of the transformer. There is very severe customer objection to noisy transformers. It becomes necessary, therefore, to disassemble the completed transformer and rebuild it.

It is an object of the invention to provide a core of the general character above described, so modified from the conventional structure as to minimize the likelihood of dirt or undesired particles of material getting into the space between the butt joint surfaces and causing a noisy core.

It is a further object of the invention to provide insulating material between the windings and core of such character that, if particles of insulating material are scraped off and get into the space between the butt joint surfaces during the assembly of the two portions of the core loop, they will disappear from the space either by being dissolved by the solvent used in the joint compound, or by melting and running from the space between the butt joint surfaces or spreading into a very thin film during the heating cycle of the transformer when placed in use, thus allowing the core portions to come close together eliminating the air gap and reducing the noise.

Other objects and advantages of the invention will be apparent from the following description of a preferred embodiment thereof, reference being had to the accompanying drawing, in which:

Figure 1 is a side elevational view of a core and coil assembly of the type of construction in which my invention may be used;

Fig. 2 is a plan view of the core and coil assembly as shown in Fig. 1;

Fig. 3 is a perspective view of a core and coil assembly with the upper portion of one core loop removed;

Fig. 4 is a view partly in elevation and partly in section illustrating the lower portions of two core loops with pieces of leg channel insulation placed therein and with the coil or winding structure about to be lowered into place;

Fig. 5 is a side elevational view, partly in section, of a core and coil assembly with the upper core portions set in place ready for banding;

Fig. 6 is an elevational view of the core and coil assembly on an assembly bench ready for banding;

Fig. 7 is a side elevational view, partly in section, of a modification of the structure shown in Figs. 4, 5 and 6; and Figs. 8 and 9 are front and side elevational views respectively, of band coupling.

Referring to the drawing, and particularly to Figs. 1 and 2 thereof, a winding or core structure 1 is illustrated which may comprise a plurality of primary and secondary coils arranged in a well-known manner in the winding space outlined in the drawing and about which two core loops or magnetic circuits 2 and 3 are positioned, each loop comprising an upper portion 4 and a lower portion 5. The core loops are formed by winding a continuous strip of magnetic material as above described which material, after being wound and bonded into a solid structure, is cut at joints 6 and 7 to form the upper and lower core portions 4 and 5 that may be suitably assembled about the winding structure. After the faces of the upper and lower portions 4 and 5 have been worked in the manner above described, the thermoplastic resin or joint compound is applied to the face which meet to form the butt joints at 6 and 7 when these core portions are assembled about the winding structure as above described, and a banding or clamping strap 8 is applied to each of the core loops extending thereabout and stretched by means of a tool. A sleeve 13 through which both ends 11 and 12 of the strap 8 pass is crimped while the strap is held in tension by the tool to attach the ends of the strap together in the coupling 9. The coupling 9 is shown in greater detail in Figs. 8 and 9 in which the opposite ends 11 and 12 of the strap are shown extending through a sleeve 13 which is crimped in the manner shown to force portions 14 of the outer edges of the sleeve 13 together with associated portions of the outer edges of the ends 11 and 12 of the banding strap which are bent or crimped together so as to form a film coupling. The crimping of the sleeve 13 and the sides of the strap passing through it, to form the coupling 9, is done while the strap is under considerable tension. The end 11 of the strap 8 may be folded back under the sleeve 13 as shown in Figs. 9 and 6.

Referring particularly to Fig. 3, one of the uppper core portions 4 is shown spaced above the lower core portion 5 with respect to one of the core loops and is then lowered into position as shown in the other core loop of Fig. 3, and in Figs. 5, 6 and 7. Insulating channel members 19, 20 and 22 are positioned on outside, inside, and at the ends, respectively, of the winding, between the winding and core as shown in Figs. 5 and 7, for example. When the upper core portion 4 is lowered into position, the lower butt joint surfaces 15 and 16 thereof will engage the butt joint surfaces 17 and 18 of the lower core portion 5, see also Fig. 4. As this is done, a corner 23 or an edge 24, in sliding over leg channel insulating pieces 19 may scrape particles of this insulation from the pieces and these particles may drop on to the surface 17, thus preventing the surfaces 15 and 17 from close engagement as is desired, and thus making a noisy core as above explained.

In order to check the noise level of the core structure, it is necessary to make a test for noise on practically all distribution transformers of the type discussed during the manufacturing operation. This test is expensive and can be eliminated if the cause of the noise is eliminated.

In accordance with the invention, a strip or shoe 25 of plastic material is placed in the area within the windows of the core loops 2 and 3 between the core loop and the winding 1. This strip extends at least over the upper end of the winding 1 having ends extending down along the outer and inner sides thereof, as shown at 26 and 27. The strip of plastic material may extend the whole way about the winding along the inner surface of the core loop as shown at 28 in Fig. 7. When the winding or coil structure 1 is lowered into position within the windows of the lower core portions 5, the downwardly extending parts of the shoe 25 are positioned on the outside of any other insulation, such as between the leg channel insulation 19 and the core so that as the upper core portion 4 is slid into position, it will slide closely adjacent to the downwardly extending portions 26 and 27 of the shoe 25. No pressboard, fiber or material of a cellular nature is used for the shoe 25 since particles might be scraped off and find their way between the butt joint surfaces of the core structure. The plastic shoe or strip 25 is formed of a material that will melt or soften and become readily deformable at temperatures below 120° C. This plastic shoe may, for example, be made of thermoplastic resins such, for example, as cellulose acetate, ethyl cellulose, methyl methacrylate, polyvinyl acetate and polystyrene. These thermoplastic resins may be used either alone or with plasticizers. A good plasticizer for cellulose acetate or ethyl cellulose is 2% to 20% by weight of dimethyl phthalate, diamyl phthalate or dibutyl phosphate.

The plastic material has such characteristics that if any particles are scraped off by the upper core portion 4 while it is being slipped over the winding structure and these particles get into the area between the butt joint surfaces of the two core portions, they are either dissolved by the solvent used in the core bonding material used as the joint compound between the surfaces, or by virtue of their low melting point. Under the compression of the band 8, they flow out into a very thin film thus allowing the core portions to come closer together under the biasing force of the band 8 which is under tension during the heating cycle in processing the transformer. This reduces the degree of noise to a low value that it is not objectionable.

Plastic shoes have been made with cellulose acetate film and applied on the assembly line of transformers quite successfully. It is found that they are not only highly abrasion resistant, and therefore tend to give very little material in the gap, but also the material is capable of being softened by the solvent in the joint compound, thus allowing the gap to come together. Other materials have been tried and it appears that ethyl cellulose is among the best all-around material, first because of its highly abrasion resistance and second because it is easily soluble in the solvents used in the joint compound, and third because it has a reasonably low melting point which will allow it to flow from the air gap under pressure at moderately low temperature.

The choice of material for the shoe may depend, to some extent, on the application of the transformer. Certain transformers operate immersed in oil. Certain others operate immersed in other insulating liquids and others are of the dry type, that is, they operate surrounded by air. For example, ethyl cellulose, while excellent for dry type transformers, is unsuitable for transformers immersed in oil or other liquid on account of its solubility in such liquid. Methyl methacrylate film would be softened by oil, however, it would not be dissolved and therefore would be satisfactory. One of the best materials for use in transformers immersed in oil or similar liquid would be cellulose acetate film.

After the upper loop portions 4 have been brought into position, as shown in Fig. 5, completing the core loop structure, a band 8 mentioned above is slipped about each one of the core loops and through the sleeve 13. A tool 32, shown in Fig. 6, then grasps one end of the band and is operated to pull this end tightly through the sleeve until a predetermined tension on the band is attained. While holding the band 8 under tension, another tool is applied to the sleeve 13 clamping it into the coupling member 9 shown in Figs. 1 and 2 to fasten the band tightly about the core loop under tension.

It will be apparent to those skilled in the art that modifications in the structure illustrated and described and the method of applying it may be made within the spirit of my invention, and I do not wish to be limited otherwise than by the scope of the appended claims.

I claim as my invention:

1. The method of making a core and coil assembly for an induction device comprising winding a strip of thin magnetic steel to form a closed loop having a plurality of turns, impregnating the loop of magnetic material with resinous bonding material, baking the impregnated loop of magnetic material to harden the resinous bonding material to bond the turns of magnetic material to one another to form a solid core, cutting the bonded core loop transversely at two places to provide two substantially U-shaped core sections, disposing one of the U-shaped sections with its legs extending upwardly, placing a preformed electrical winding, carrying conventional insulating materials which will not soften or spread at temperatures below 120° C. and from which pieces of insulation may be cut by the sharp edges of a core section during assembly, with a portion of the winding turns disposed between the upwardly extending legs of said core section, placing a sheet of thermoplastic resinous material having a melting or softening point below 120° C. over the upper end of the preformed electrical winding and extending it downwardly below the ends of the upwardly extending legs of the core section, placing the second core section over the winding with the cut surfaces of the two core sections meeting to form butt joints, and placing a resilient band of metal under tension around said loop to maintain a pressure between the faces forming the butt joints.

2. The method of making a core and coil assembly for an induction device comprising winding a strip of thin magnetic sheet steel to form a closed loop having a plurality of turns, impregnating the loop of magnetic material with a resinous bonding material and baking to harden the resinous bonding material to bond the turns to one another, cutting the bonded core loop transversely at two places to form two substantially U-shaped core sections, placing one U-shaped section of the core with its spaced legs extending upwardly to receive a winding, placing an electrical winding, carrying conventional insulating material which will not soften or spread at temperatures below 120° C. and from which pieces of insulation may be cut by the sharp edges of the core loop sections during assembly, with a portion of the winding between the legs of said core loop, protecting the insulation on the winding with a sheet of thermopastic resin having a softening point below 120° C., and placing the second section of the core loop over the winding with the cut surfaces of the two portions of the core loop meeting one another to form butt joints, and bonding the meeting surfaces of the core sections forming the butt joints to one another.

3. The method of making a core and coil assembly for an induction device comprising winding a strip of thin magnetic sheet steel to provide a closed loop having a plurality of turns around a window, impregnating the loop of magnetic material with a resinous material to bond adjacent turns of the loop to one another, baking the resinous material to harden it and form a solid core, cutting the bonded core loop transversely at two places to form two U-shaped core loop sections, arranging one of the U-shaped sections of the core loop with its legs extending upwardly, protecting a portion of an electrical winding, provided with conventional insulation which will not soften or spread at temperatures below 120° C. and from which pieces may be cut by sharp edges of the core loop sections during assembly, with a layer of a thermoplastic resinous material having a melting or softening point below 120° C., placing the protected electrical winding with a portion of the winding turns between the upwardly extending legs of the core section, the protecting thermoplastic resinous material on the electrical winding extending below the upper edges of the upwardly extending legs of the core section, placing the second section of the core loop over the winding with the cut surfaces of the two core sections meeting to form butt joints, and placing a resilient band of metal under tension around said loop sections for maintaining a substantially constant pressure between said butt joints.

4. The method of making a core and coil assembly for an induction device comprising winding a strip of thin magnetic sheet steel to provide a closed loop having a plurality of turns around a window, impregnating the loop of magnetic material with a resinous material to bond the turns of the loop to one another, baking the resinous material to harden it and form a solid core structure, cutting the bonded core loop transversely at two places to form two U-shaped core loop sections, arranging one of the U-shaped core loop sections with its legs extending upwardly, protecting a portion of an electrical winding, provided with conventional insulation which will not soften or spread at a temperature below 120° C. and from which pieces may be cut by the sharp edges of the core loop sections during assembly, with a thermoplastic resinous material having a melting or softening point below 120° C., the protecting thermoplastic resin being selected from the group consisting of cellulose acetate, ethyl cellulose methyl methacrylate, polyvinyl acetate and polystyrene, placing the protected electrical winding with a portion of the winding turns between the upwardly extending legs of the core section, placing a second section of the core loop over the winding with the cut surfaces of the two core sections meeting to form butt joints, and placing a resilient band of metal under tension about said loop sections for maintaining a substantially constant pressure between the faces of the butt joints.

JAMES G. FORD.

REFERENCES CITED

The following references are of record in the file of this patent:

UNITED STATES PATENTS

| Number | Name | Date |
|---|---|---|
| 1,888,275 | Larsen | Nov. 22, 1932 |
| 1,888,288 | Purdy | Nov. 22, 1932 |
| 2,118,924 | Henderson | May 31, 1938 |
| 2,184,342 | Grupe | Dec. 26, 1939 |
| 2,382,172 | Putman et al. | Aug. 14, 1945 |
| 2,394,648 | Woolfolk | Feb. 12, 1946 |
| 2,404,016 | Wiegand | July 16, 1946 |
| 2,408,211 | Hodnette | Sept. 24, 1946 |
| 2,411,374 | Horstman | Nov. 19, 1946 |